US007784644B2

(12) United States Patent
Albert et al.

(10) Patent No.: US 7,784,644 B2
(45) Date of Patent: Aug. 31, 2010

(54) TANDEM GATE RELEASE MECHANISM FOR A VENDING MACHINE

(75) Inventors: Richard T. Albert, Aiken, SC (US); Dan Bowen, Aiken, SC (US); Bryan Alan Collins, New Ellenton, SC (US); Aron Phillip Lewis, Aiken, SC (US); Paul Miller, Aiken, SC (US); Charles Wayne Percy, Aiken, SC (US); John Robinson, Aiken, SC (US); William E. Roe, Sanford, NC (US); Russell Watts, Aiken, SC (US)

(73) Assignee: Dixie-Narco, Inc., Williston, SC (US)

( * ) Notice: Subject to any disclaimer, the term of this patent is extended or adjusted under 35 U.S.C. 154(b) by 647 days.

(21) Appl. No.: 11/249,376

(22) Filed: Oct. 14, 2005

(65) Prior Publication Data

US 2007/0084877 A1 Apr. 19, 2007

(51) Int. Cl.
*G07F 11/22* (2006.01)
*B65G 59/00* (2006.01)
*G07F 11/00* (2006.01)

(52) U.S. Cl. .......................... 221/274; 221/226; 221/7; 221/124; 221/298; 221/279; 221/289; 221/299; 221/301; 221/250; 221/270; 221/251; 221/268; 221/133

(58) Field of Classification Search ................. 221/274, 221/250, 270, 226, 298, 279, 289, 299, 301, 221/7, 92, 124, 133, 251, 268
See application file for complete search history.

(56) References Cited

U.S. PATENT DOCUMENTS 4,423,828 A 1/1984 Tanaka et al.
5,497,905 A * 3/1996 Vogelpohl et al. ........... 221/226
5,511,688 A 4/1996 Duncan et al.
5,651,476 A 7/1997 Percy et al.
5,695,074 A 12/1997 Wiese
5,799,823 A 9/1998 Feltrin
6,012,604 A 1/2000 Takahashi et al.
6,230,930 B1 5/2001 Sorensen et al.
6,241,121 B1 6/2001 Yasaka
6,253,954 B1 7/2001 Yasaka
6,328,180 B1 12/2001 Sorensen et al.

(Continued)

FOREIGN PATENT DOCUMENTS

EP 343505 A2 11/1989

(Continued)

*Primary Examiner*—Gene O. Crawford
*Assistant Examiner*—Rakesh Kumar

(57) ABSTRACT

A vending machine includes first and second integrated dispensing systems mounted at front portions of adjacent product shelf dividers establishing at least first, second and third product queues. Each of the first and second dispensing systems includes first and second release mechanisms having a plurality of hinged plates supported by a frame. The plurality of hinged plates are selectively shifted into and out of corresponding ones of the first, second and third product queues, such that each product queue has associated therewith two opposing release mechanisms. Preferably, at least one of the first and second release mechanisms for each dispensing system includes a queue spacing member which is mounted to one of the hinged plates and projects into the product queue to establish a desired spacing between the release mechanisms.

20 Claims, 13 Drawing Sheets

U.S. PATENT DOCUMENTS

| | | | | |
|---|---|---|---|---|
| 6,431,398 | B1 | 8/2002 | Cook et al. | |
| 6,467,648 | B1 * | 10/2002 | Nishiyama et al. | 221/7 |
| 6,571,988 | B2 * | 6/2003 | Bowen | 221/274 |
| 6,962,267 | B2 | 11/2005 | Herzog et al. | |
| 7,404,501 | B2 * | 7/2008 | Kelly | 221/241 |
| 7,604,145 | B2 * | 10/2009 | Percy | 221/95 |
| 2004/0056042 | A1 | 3/2004 | Skavnak | |
| 2005/0252925 | A1 * | 11/2005 | Kelly | 221/92 |

FOREIGN PATENT DOCUMENTS

| | | |
|---|---|---|
| JP | 05-197877 | 8/1996 |
| JP | 2001-357443 | 12/2001 |

* cited by examiner

TANDEM GATE RELEASE MECHANISM FOR A VENDING MACHINE

BACKGROUND OF THE INVENTION

1. Field of the Invention

The present invention pertains to the art of vending machines and, more particularly, to a tandem gate release mechanism that is selectively shiftable from an article retention position to an article dispensing position during a vend operation.

2. Discussion of the Prior Art

Vending machines for dispensing canned and/or bottled beverages have long been known. Early model vending machines release similarly sized bottles, one at a time, following deposit of the required purchase amount. In order to withdraw the selected bottle from the vending machine, the purchaser was required to, for example, manually remove a beverage container through a release mechanism on a shelf. Over time, manufacturers developed various other mechanisms for releasing products from vending machines. These arrangements range from a more conventional mechanism wherein the products are guided within a chute, often times along a serpentine path, into a delivery port, to more unique mechanisms such as the use of transport systems that shift a product transport carrier to a point adjacent a selected product, receive the selected product and then deliver the selected product to the consumer.

At present, specialty beverages such as sports drinks, flavored teas, fruit juices, milk and the like are growing in popularity. Typically, these beverages are packaged in glass or plastic bottles that are available in many different sized and shaped containers. Given the variety of container sizes, mechanisms for releasing selected products during a vend operation must be capable of accommodating the wide range of containers available to today's consumers. As the number of different sized and shaped containers continues to grow, it becomes increasingly difficult to insure a proper vending operation with standard dispensing systems.

In order to accommodate a broad range of containers, most vending machines employ shims to adjust a width of a product queue. Using appropriate shims, a technician can modify the product queue to accept a wide range of containers. In other vending machines, side walls of the product queue can be shifted in order to set a desired width. Regardless of the method employed, adjusting a width of a product queue to accept different sized containers requires considerable effort and knowledge for proper operation. For instance, a typical product queue is sized to accommodate a small range of products. If a vendor misloads or otherwise places containers in the product queue that are outside the small range, a misvend can occur. For example, placing smaller containers in a product queue sized for larger containers can result in multiple vends.

Based on the above there exists a need in the art for a release mechanism that can be used to dispense a wide range of product containers. More specifically, there exists a need for a release mechanism that can, without requiring reconfiguration, readily accommodate a wide range of product containers.

SUMMARY OF THE INVENTION

The present invention is directed to a release mechanism for a vending machine including a cabinet within which is arranged a product storage zone having at least one shelf for storing and displaying products prior to a vend operation. The shelf is provided with a plurality of dividers that establish at least first, second and third adjacent product queues. Each of the plurality of dividers includes a first end, a second end and an intermediate portion. In accordance with the invention, a first integrated dispensing system is mounted at the front end of one of the plurality of dividers and a second integrated dispensing system mounted at the front end of an adjacent one of the plurality of dividers.

The first integrated release system includes a first release mechanism having a frame for supporting a plurality of hinged plates for movement into and out of the first product queue. The first integrated dispensing system also includes a second release mechanism including a plurality of hinged plates supported by the frame for movement into and out of the second product queue. Preferably, one of the plurality of hinged plates includes a queue spacing member that projects into the second product queue.

The second integrated release system includes a first release mechanism having a frame for supporting a plurality of hinged plates for movement into and out of the second product queue. In a manner similar to that described above, the second integrated dispensing system also includes a second release mechanism having a plurality of hinged plates supported by the frame for movement into and out of the third product queue. Preferably, one of the plurality of hinged plates including a queue spacing member that projects outward from one of the plurality of hinged plates into the third product queue.

In further accordance with the invention, a drive mechanism is operatively connected to the second release mechanism of the first integrated dispensing system and the first release mechanism of the second integrated dispensing system. More specifically, the drive mechanism can be selectively activated during a vend operation to simultaneously shift the plurality of hinged plates of the second release mechanism of the first integrated dispensing system in unison with the hinged plates of the first release mechanism of the second integrated dispensing system between article retention and article dispensing positions in order to effectively and efficiently dispense a product stored in the second product queue.

Additional objects, features and advantages of the present invention will become more readily apparent from the following detailed description of preferred embodiments when taken in conjunction with the drawings wherein like reference numerals refer to corresponding parts in the several views.

DETAILED DESCRIPTION OF THE PREFERRED EMBODIMENTS

Figure 1:
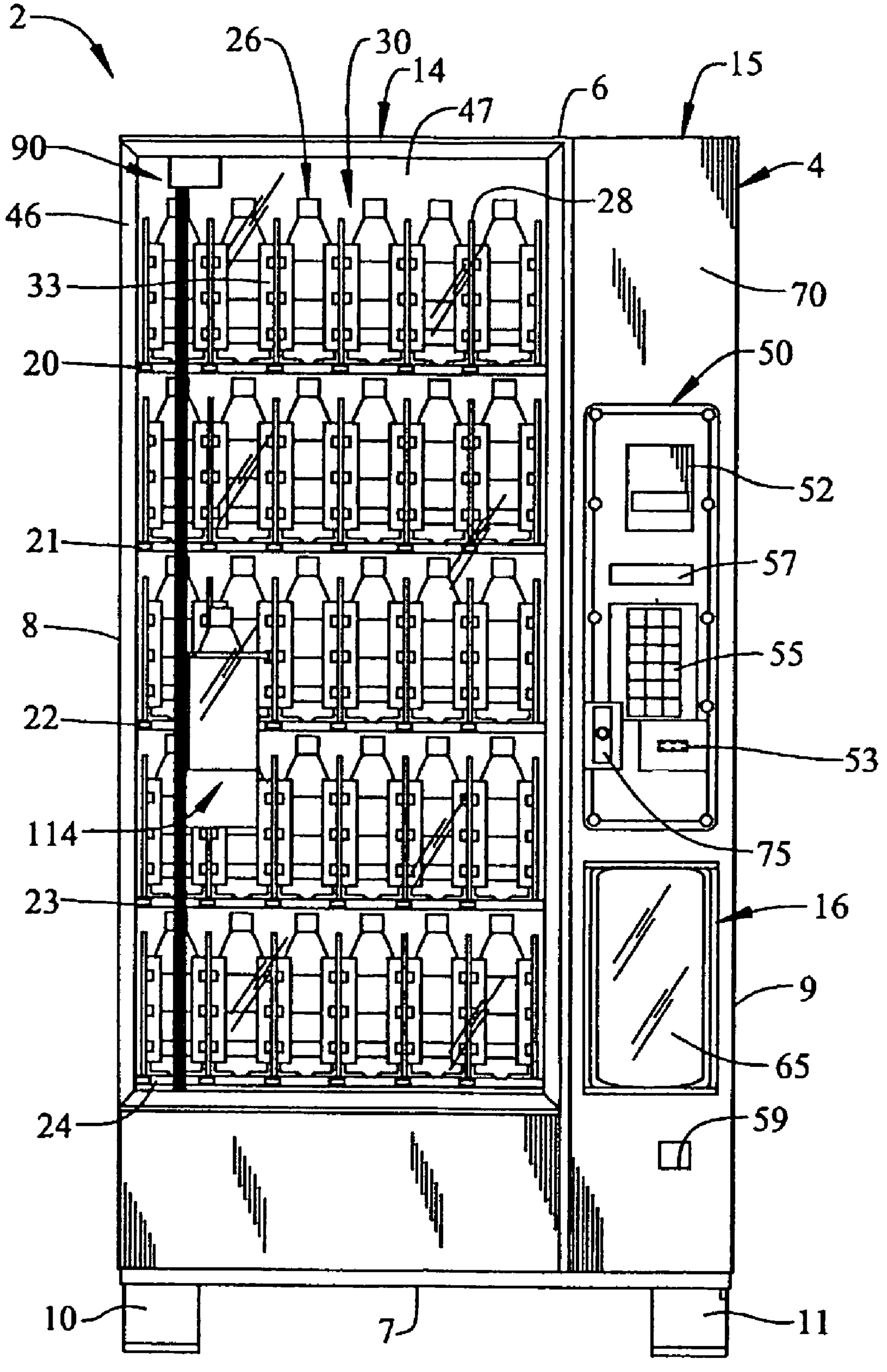
FIG. 1 is a front elevational view of a vending machine constructed in accordance with the present invention.
Figure 2:
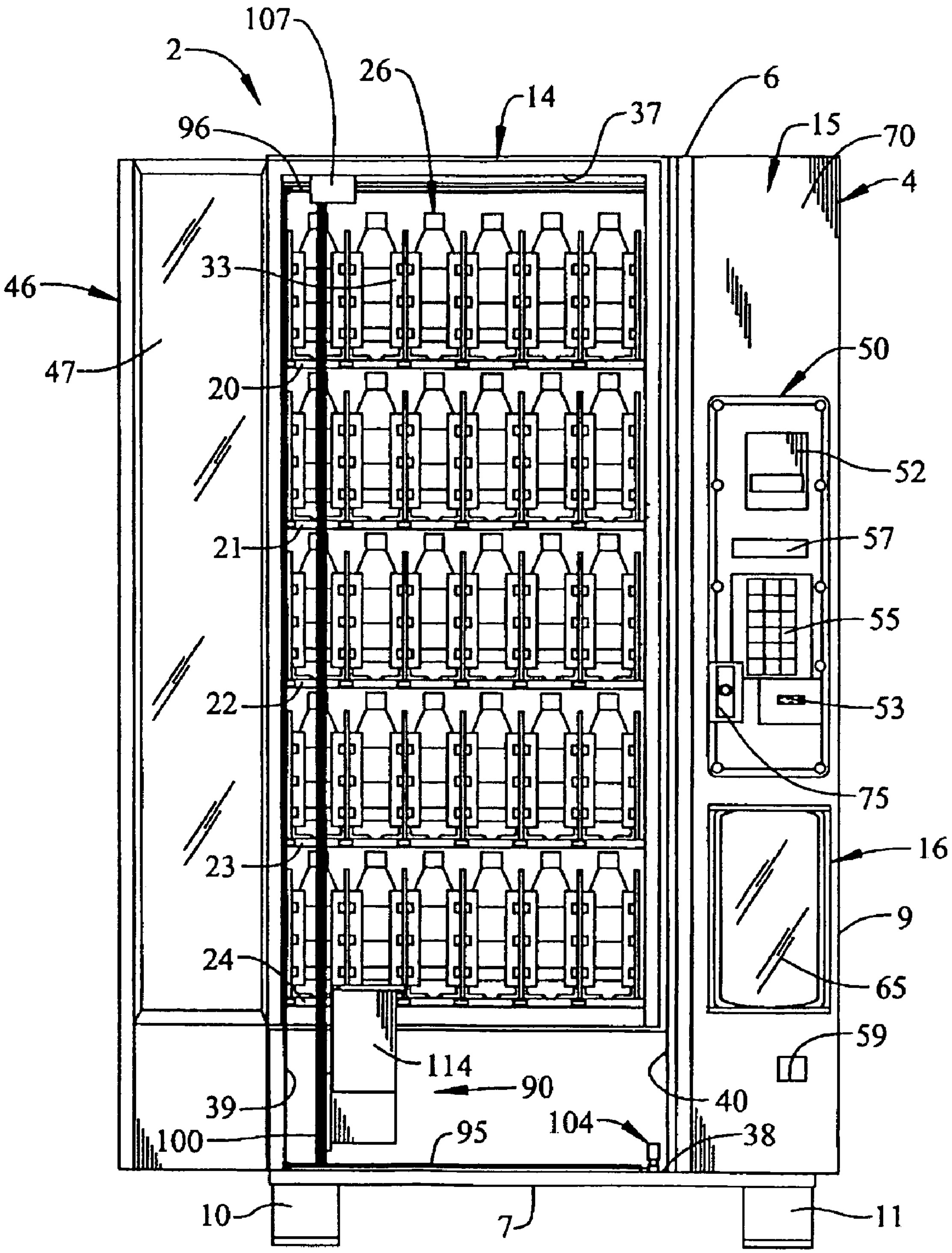
FIG. 2 is an elevational view of the vending machine of FIG. 1 with the door of a product storage zone shown open.

With initial reference to FIGS. 1 and 2, a vending machine generally indicated at 2 includes a cabinet 4. As shown, cabinet 4 includes top, bottom and opposing side walls 6-9. Arranged below bottom wall 7 are various leg members 10 and 11 for positioning vending machine 2 upon a supporting surface (not shown). In the preferred embodiment shown, vending machine 2 is divided into a plurality of zones, with each zone being associated with a particular portion of a vending operation. Towards that end, vending machine 2 includes a storage and display zone 14, a currency receiving zone 15 and a dispensing zone 16.

As illustrated, storage/display zone 14 is provided with a plurality of product support shelves 20-24 for supporting and displaying a plurality of product containers, one of which is indicated at 26. Preferably, each of the plurality of product support shelves is mounted, at a downwardly and forwardly extending shelf angle, to ensure that product containers moves toward a forward following a vend operation. In addition, each of the plurality of product support shelves 20-24 includes a plurality of dividers, one of which is indicated at 28, that establish a plurality of product queues, one of which is indicated at 30 on product support shelf 20. Each of the plurality of product queues 30 includes an integrated dispensing or escapement unit 33. Actually, integrated dispensing unit 33 is mounted at a front end (not separately labeled) of each of the plurality of dividers 28 and, as will be discussed more fully below, is selectively activated to release a product container 26 from storage/display zone 14 for delivery to a consumer. In a manner known in the art, storage/display zone 14 includes top, bottom and opposing side walls 37-40 (see FIG. 2) and is provided with a door 46 having a glass panel 47 to enable a consumer to view and choose between the variety of product containers 26 carried within vending machine 2.

Arranged alongside storage/display zone 14 is currency receiving zone 15. In the embodiment shown, currency receiving zone 15 includes a currency receiving center 50 for inputting currency deposited by the consumer during a vend transaction. Currency receiving center 50 includes a bill acceptor/validator 52, a multi-price coin mechanism 53 and a key pad 55 for inputting particular product selections. Currency receiving center 50 also includes a display 57 for providing information to the consumer, as well as validating the particular selection made. Finally, a coin return slot 59 is provided for returning any required change to the consumer at the completion of a vend operation. Arranged below currency receiving zone 15, dispensing zone 16 includes a dispensing chamber 65 that enables a consumer to remove a dispensed product from vending machine 2. In the embodiment shown, currency receiving zone 15 and dispensing zone 16 are provided on a door 70 that overlaps door 46 and therefore must be opened prior to opening door 46. To this end, door 70 is preferably provided with a lock 75 that prevents unauthorized access to within vending machine 2.

In accordance with the invention, vending machine 2 includes a product transport and delivery system 90 that receives one of the plurality of product containers 26 from one of the plurality of product queues 30 and transports the selected product towards delivery chamber 65 for receipt by the consumer. As referenced in FIG. 2, product transport system 90 includes a first, laterally extending guide rail 95 arranged on lower wall 38 of product storage zone 14, a second, laterally extending guide rail 96 arranged on upper wall 37 and an upstanding carriage rail 100 that extends across storage/delivery zone 14 between first and second guide rails 95 and 96. Product transport system 90 also includes a first or horizontal axis translation mechanism 104 for shifting carriage rail 100 between the plurality of product queues 30 and a second or vertical axis translation mechanism 107 that selectively shifts a product delivery cup 114, that is slidably supported by carriage rail 100, between the plurality of product shelves 20-24. In any case, product transport system 90 shifts product delivery cup 114 along multiple axes to receive and transport a selected product container 26 from one of the plurality of product queues 30 towards dispensing chamber 65 in a manner that will be detailed more fully below.

Figure 3:
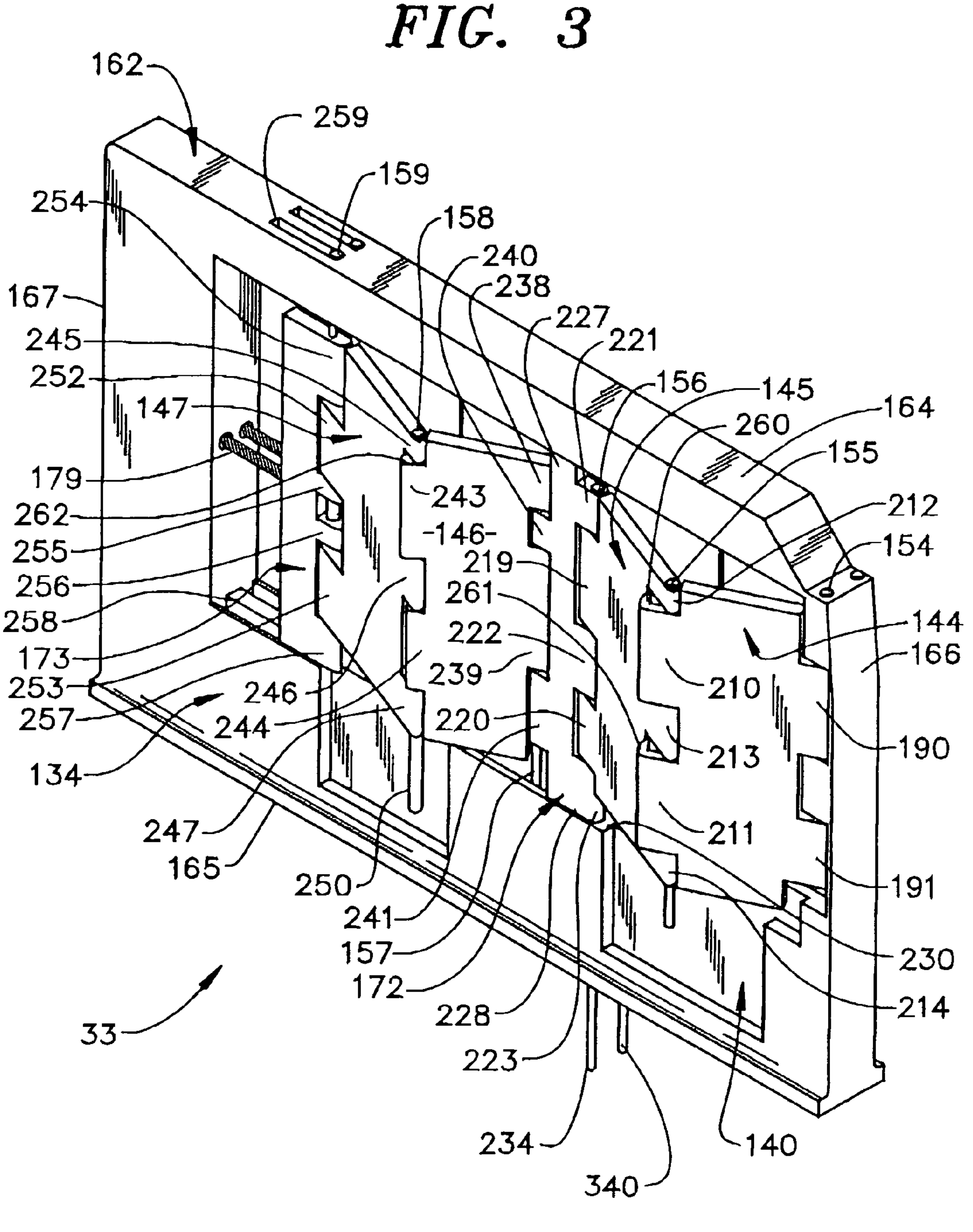
FIG. 3 is an upper right perspective view of an integrated dispensing system illustrating a first release mechanism constructed in accordance with the present invention.

In accordance with one embodiment of the invention, integrated dispensing unit 33 includes first and second release mechanisms 134 and 135. Referring to FIG. 3, release mechanism 134 generally includes a set of hinged plates 140 which is composed of plates 144-147, elongated hinge pins 154-159, a frame 162 having top, bottom, front and rear wall sections 164-167, slidable connectors 172 and 173, and a spring 179. More specifically, hinge plate 144 includes tab portions 190 and 191 which have aligned bores (not shown). Hinge pin 154 extends through a bore (not labeled) formed in frame 162, as well as the aligned bores in tab portions 190 and 191. In this fashion, hinge plate 144 can pivot relative to frame 162.

Hinge plate 144 is also pivotally attached to hinge plate 145, with hinge pin 155 extending through bores in tab portions 210 and 211 of hinge plate 144 and tab portions 212-214 of hinge plate 145. In a similar manner, hinge plate 145 is pivotally attached to slidable connector 172, with hinge pin 156 extending through bores in tab portions 219 and 220 in hinge plate 145 and tab portions 221-223 of connector 172. In a manner that will be detailed more clearly below with regard to release mechanism 135, slidable connector 172 includes upper and lower projecting portions 227 and 228. The upper projecting portion is adapted to slide along a flange formed in top wall section 164, while the lower projecting portion is shiftably arranged within an open-ended elongated slot 230 defined in bottom wall section of frame 162. In this fashion, connector 172 is guided for sliding movement relative to frame 162. Hinge pin 156 includes an extension or drive member 234 which actually projects entirely through bottom wall section 165 of frame 162. With this arrangement, a linear force applied to extension 234 will cause first release mechanism 134 to transition between product retention and product dispensing positions as will be detailed more fully below.

In a similar manner, hinge plate 146 is pivotally attached to slidable connector 172, with hinge pin 157 extending through bores in tab portions 240 and 241 of slidable connector 172 and, tab portions 238 and 239 of hinge plate 146. Likewise, hinge plate 146 is pivotally attached to hinge plate 147 with hinge pin 158 extending through bores in tab portions 243 and 244 of hinge plate 146 and tab portions 245-247 of hinge plate 147. Actually, hinge pin 158 includes an extension 250 that ensures a smooth transition of products in each product queue 30. More specifically, extension 250 abuts an outer surface of certain product containers to ensure that the product containers do not get “caught” in product queue 30. That is, certain product containers, such as those having outer ribs, ridges or the like, pass by extension 250, ensuring a smooth transition. Finally, as will be detailed more fully below with respect to release mechanism 135, hinge plate 147 is pivotally mounted to slidable connector 173, with hinge pin 159 extending through bores in tab portions 252 and 253 of hinge plate 147 and tab portions 254-257 of slidable connector 173. Slidable connector 173 includes a lower projecting portion (not separately labeled) that extends into an elongated slot 258 formed in frame 162, while hinge pin 159 includes an upper section (not separately labeled) that is arranged with an elongated guide slot 259 formed in frame 162. In any case, it should be noted that slidable connectors 172 and 173 shift relative to frame 162 to move hinge plates 144-147 between article retention and dispensing positions, as will be discussed more fully below, while spring 179 biases each of slidable connectors 172 and 173, and hinged plates 144-147 towards front wall 166.

Figure 6A:
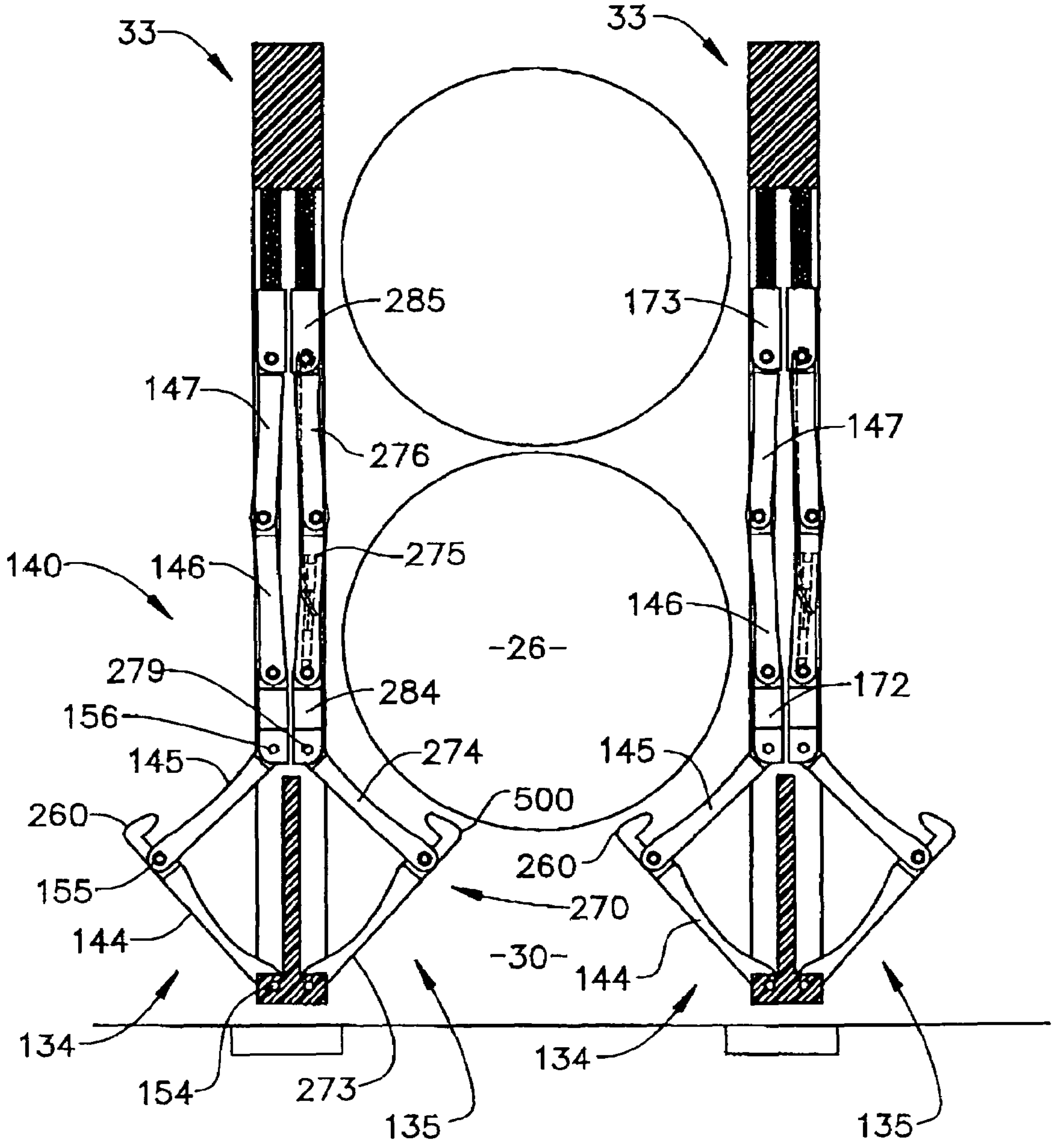
FIG. 6A is a top view of two integrated dispensing systems arranged side by side at a front portion of a product queue, with first and second release mechanisms of the integrated dispensing systems in product retention positions.

In accordance with a preferred form of the invention, hinge plate 144 is provided with first and second queue spacing members 260 and 261 which project into the product queue when release mechanisms 134 and 135 are in the article retention position as shown in FIG. 6A. Queue spacing members 260 and 261 establish a desired spacing between opposing release mechanisms 134 and 135 for a given product queue to enable the loading of various sized product containers into the product queue without requiring a technician or service personnel to set a desired width of the product queue through the use of, for example, shims. This is particularly important in connection with relatively small diameter or width products. Also, it should be noted that hinge plate 146 also includes a queue spacing member 262 that, when release mechanism 134 is shifted to the article dispensing position, projects into the product queue to establish a desired spacing in the product queue to prevent multiple vends as will be discussed more fully below.

Figure 4:
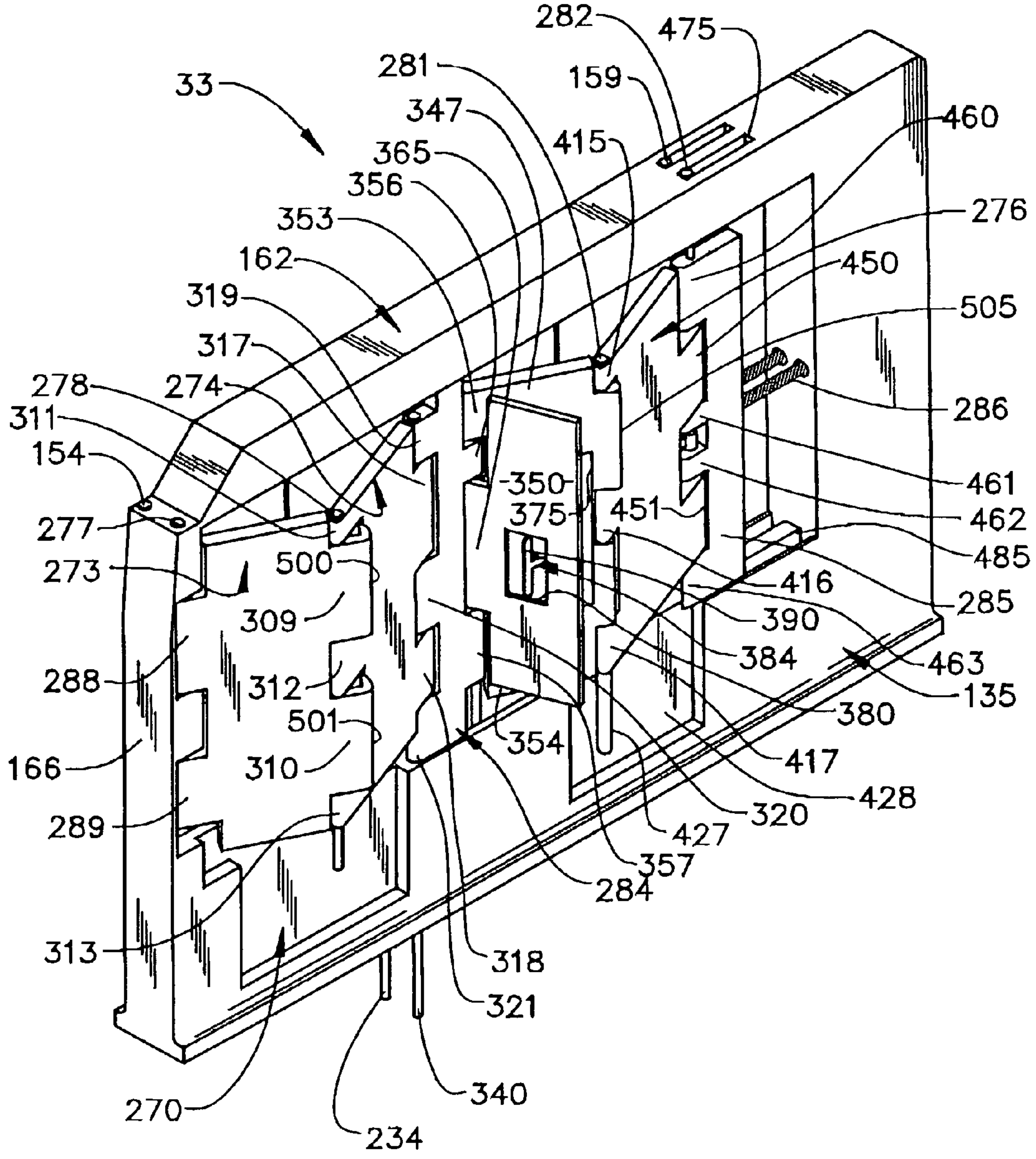
FIG. 4 is an upper left perspective view of the integrated dispensing system of FIG. 3 illustrating a second release mechanism thereof.
Figure 5:
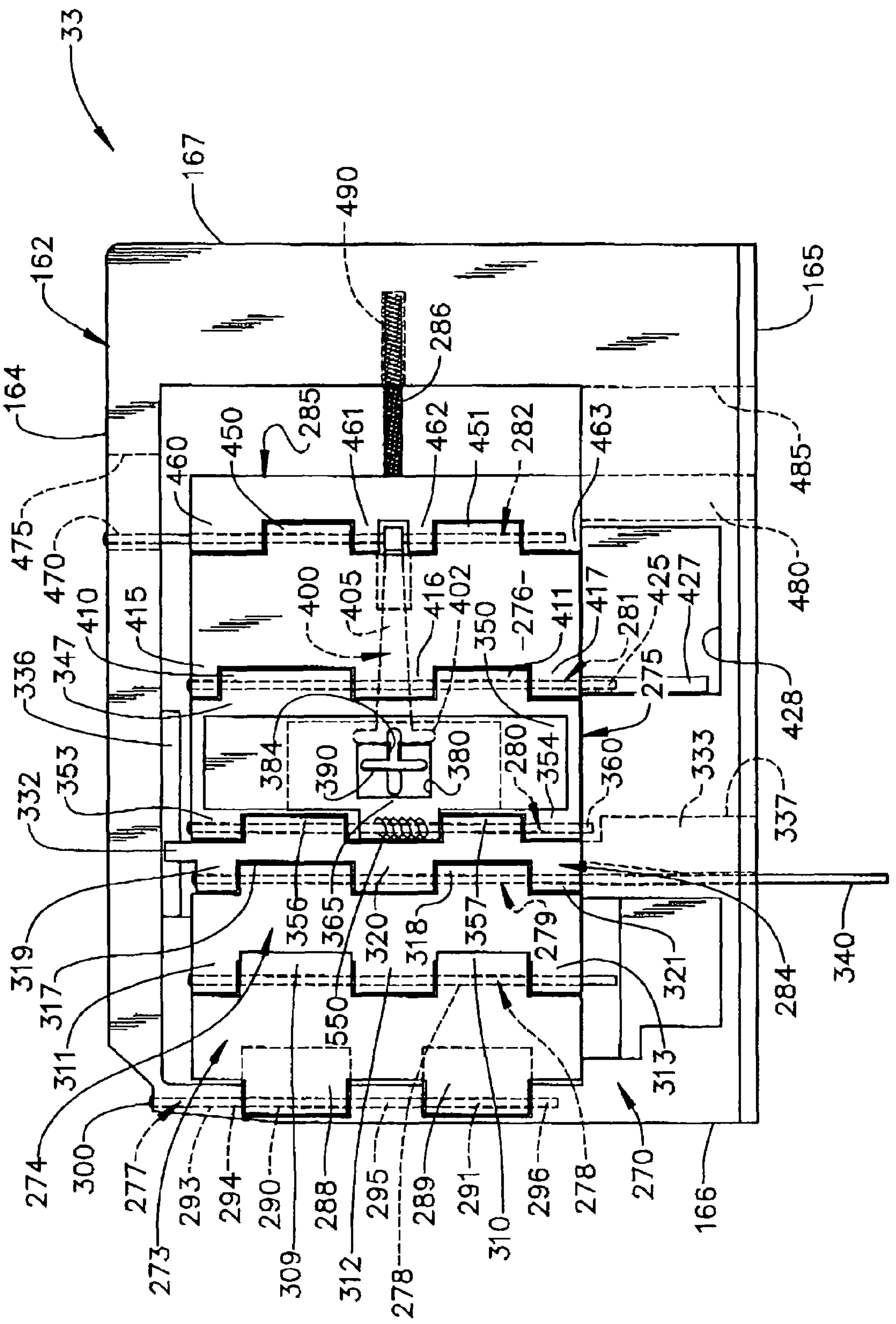
FIG. 5 is an elevational view of the second release mechanism of FIG. 4.

Reference will now be made to FIGS. 4 and 5 in describing release mechanism 135 of integrated dispensing unit 33. In a manner analogous to that set forth above with respect to release mechanism 134, release mechanism 135 generally includes a set of hinged plates 270, which is composed of plates 273-276, elongated hinge pins 277-282, slidable connectors 284 and 285, and a spring 286. At this point, it should be noted that the set of hinge plates 270 are supported in frame 162 adjacent the set of hinge plates 140. In any event, hinge plate 273 includes tab portions 288 and 289 which have aligned bores 290 and 291. Hinge pin 277 extends through a bore 293, which has upper, intermediate and lower sections 294-296 formed in frame 162, as well as bores 290 and 291 in tab portions 288 and 289 of hinge plate 273. Hinge pin 277 has a slightly enlarged head 300 which abuts frame 162. In this fashion, hinge plate 273 can pivot relative to frame 162. Preferably, hinge pin 277 is tightly received in bore 293 and has a slightly greater tolerance with bores 290 and 291 such that hinge pin 277 does not rotate upon pivoting of plate 273. Actually, at this point it should be noted that the relationship between the hinge pin and the bores as described above is also true for hinge pin 154 of release mechanism 134.

Hinge plate 273 is also pivotally attached to hinge plate 274 with a hinge pin 278 extending through aligned bores (not separately labeled) formed in tab portions 309 and 310 of hinge plate 273 and tab portions 311-313 of hinge plate 274. Similarly, hinge plate 274 is pivotally attached to slidable connector 284, with hinge pin 279 extending through tab portions 317 and 318 of hinge plate 274 and tab portions 319-321 of slidable connector 284. Slidable connector 284 includes an upper projecting portion 332 and a lower projecting portion 333. Upper projecting portion 332 is adapted to slide upon a flange 336 of frame 162, while lower projecting portion 333 is shiftably arranged within an open-ended elongated slot 337 defined in frame 162. Hinge pin 279 includes an extension or drive member 340 which actually extends entirely through slot 337. In this fashion, connector 284 is guided for sliding movement relative to frame 162 and a linear force can act upon extension 340 to reposition release mechanism 135 during a dispensing operation as will be discussed more fully below.

As shown, hinge plate 275 includes a main plate member 347 and a sub-plate or kicker member 350. Main plate member 347 is pivotally attached to slidable connector 284 by means of hinge pin 280 extending through both tab portions 353 and 354 of main plate member 347 and tab portions 356 and 357 of slidable connector 284. In a manner similar to hinge pin 279 with respect to lower projecting portion 333 of slidable connector 284, a lower end 360 of hinge pin 280 is received in slot 337. At the same time, kicker member 350 is pivotable about an axis defined by hinge pin 280 since hinge pin 280 also extends through tab portion 365 of kicker member 350. With this arrangement, kicker member 350 can also pivot relative to main plate member 347 during a dispensing operation as will be discussed more fully below. Main plate member 347 includes a central cut-out or recessed region 375 into which is arranged a thickened central portion 376 (see FIG. 6B) of kicker member 350 when release mechanism 135 assumes the article retention position shown in FIG. 6A. Kicker member 350 also includes an exposed recess 380 having a generally fore-to-aft extending slot 384 formed therein. A terminal cross leg 390 of a pusher link 400 projects through slot 384, while another cross leg 402 is arranged on the other side of slot 384. A tapering main leg 405 of pusher link 400 extends and is rotatably attached to hinge pin 282.

Main plate member 347 is also pivotally connected to hinge plate 276 through hinge pin 281. More specifically, hinge pin 281 extends through tab portions 410 and 411 of main plate member 347 and tab portions 415-417 of hinge plate 276. A terminal end 425 of hinge pin 281 is provided with an extension 427 that is adapted to abut a recessed section 428 of frame 162 to limit the movement of hinge plates 275 and 276 as shown in FIG. 6A. Actually, extension 427 operates in a manner similar to that described above with respect to extension 250. More specifically, extensions 250 and 427 serve to limit movement of respective ones of hinged plates 146, 147 and 275, 276, as well as provide for a smooth transition for product containers. Hinge plate 276 also has tab portions 450 and 451 through which hinge pin 282 extends. Hinge pin 282 also extends through tab portions 460-463 of slidable connector 285. Furthermore, an upper section 470 of hinge pin 282 is arranged within an elongated guide slot 475 formed in frame 162.

Slidable connector 285 includes a lower projecting portion 480 slidably arranged in an elongated slot 485 formed in frame 162. Slidable connector 285 is biased in a forward direction by means of spring 286. Although not clearly shown, slidable connector 285 has projecting therefrom a rear shaft about which spring 286 is arranged. The shaft extends a short distance into a longitudinal bore 490 formed in frame 162, while spring 286 extends all the way into bore 490. In general, the shaft provides desired directional stability to this overall biasing arrangement.

Figure 6B:
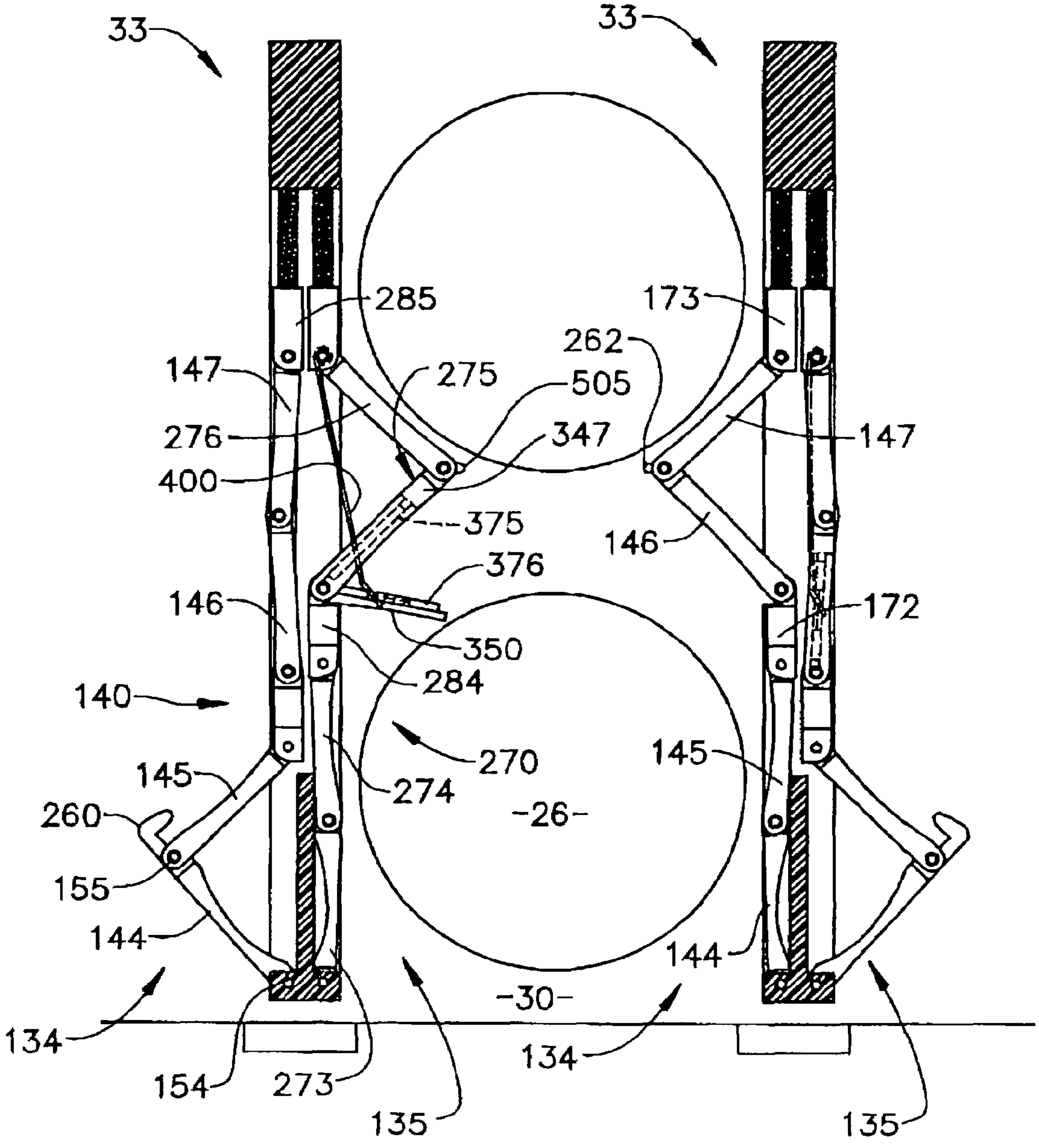
FIG. 6B is a top plan view of the two integrated dispensing systems of FIG. 6A illustrating the first and second release mechanisms in a product dispensing position.

In a manner similar to that described above, hinge plate 273 is provided with first and second queue spacing members 500 and 501. Queue spacing members 500 and 501 project outward from hinge plate 273 into product queue 30. More specifically, as shown in FIG. 6A, queue spacing members 260, 261 and 500, 501 project towards each other to establish a desired spacing therebetween in product queue 30. With this arrangement, release mechanisms 134 and 135 can accommodate varying sized containers, including 8 to 20 ounce beverage containers, without requiring a technician to physically change the width of product queue 30. Also, in a manner similar to that set forth above, hinge plate 275 is provided with a queue spacing member 505 that projects toward queue spacing member 262 of hinge plate 146 to maintain a desired spacing therebetween when release mechanisms 134 and 135 are in the product release position (FIG. 6B). Without spacing members 260, 261, 262, 501 and 505, relatively small diameter or width products may slip between the gate or release mechanisms 134 and 135, resulting in double or multiple vends.

With this construction, release mechanisms 134 and 135 initially assume the position shown in FIG. 6A, with hinge plates 144, 145 and 273, 274 extending into product queue 30. Actually, hinge plates 270 of release mechanism 135 of a first integrated release unit 33 extend into product queue 30, while hinge plates 140 of an adjacent release unit 33 extend into product queue 30 to form a barrier for containers 26. That is, as shown in FIG. 6A, release mechanisms 134 and 135 are in a product retention position preventing the vending of, for example, product container 26. Upon selection of a particular product, elongated portions 234 and 340 of hinge pins 156 and 279 are shifted rearward (in a manner detailed below), causing dispensing mechanisms 134 and 135 to shift to the product release position as shown in FIG. 6B.

As shown, when shifting to the product release position, kicker plate 350 engages with product container 26, urging product container 26 forward into product delivery cup 114, while hinge plates 146, 147 and 275, 276 assume an article blocking position preventing multiple vends. In accordance with one aspect of the invention, kicker plate 350 is coupled to a low torsion spring 550. Spring 550 actually retards the deployment of kicker 350 when shifting to the product release position establishing a particular timing for engaging with product container 26. In particular, this arrangement allows hinge plates 144, 145, 273 and 274 to move at least partially to the product release position prior to the motion kicker plate 350. Also, given the presence of queue spacing members 262 and 505, when in the dispensing position, hinge plates 146, 147 and 275, 276 prevent multiple product containers from being dispensed from product queue 30. That is, instead of making adjustments to, for example, dividers 28 or escapement/dispensing units 33 to accommodate different size product containers, queue spacing members 262 and 505 establish a preferred spacing between adjacent dispensing units 33 to prevent multiple vends. In a similar manner, subsequent to the vending operation, a new product container is urged to a forward portion of the product queue, with queue spacing members 260, 261 and 500, 501 setting an appropriate size for the product to prevent smaller product containers from inadvertently exiting the product queue.

Figure 7A:
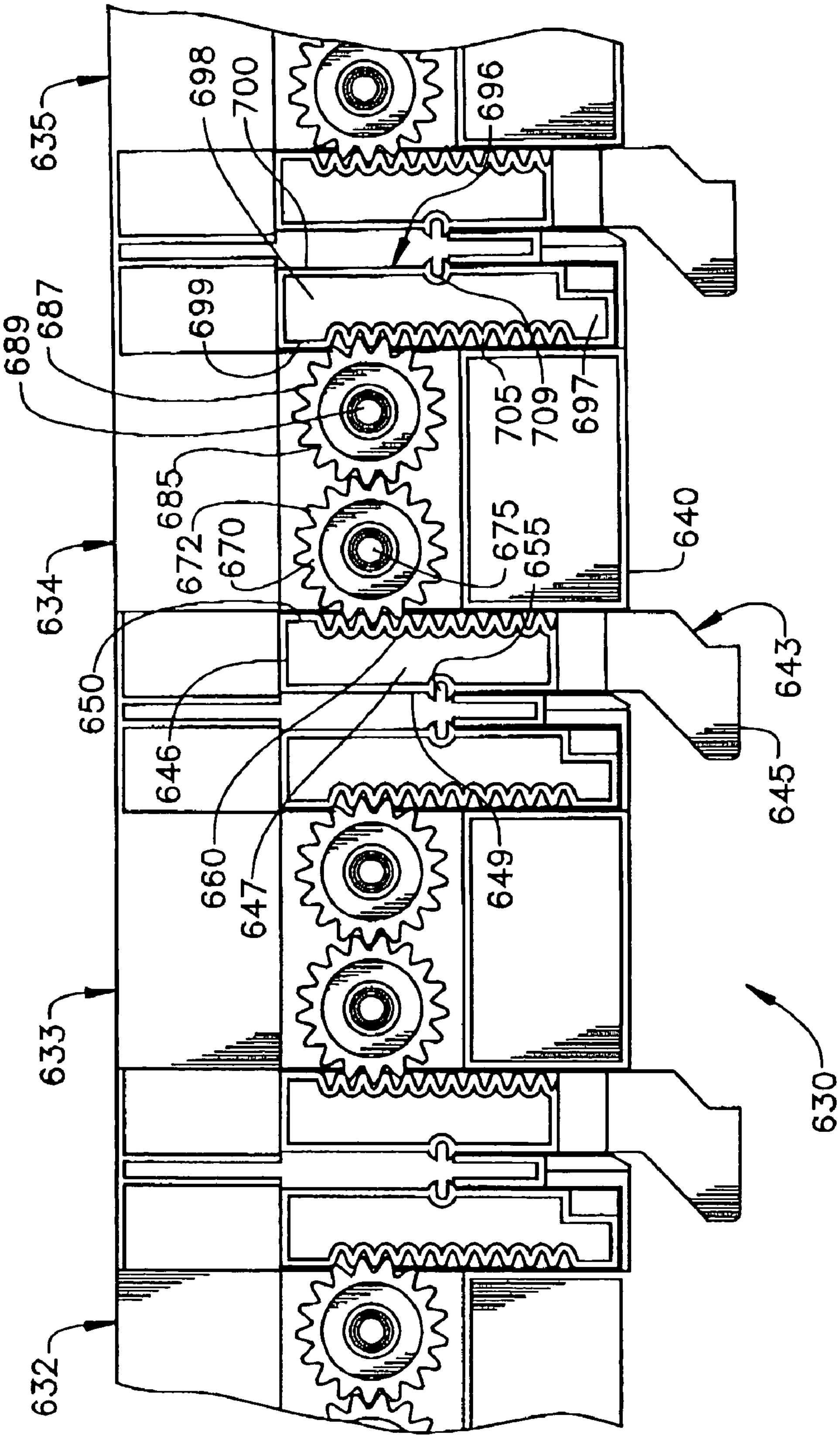
FIG. 7A is a top plan view of a drive system, constructed in accordance with one embodiment of the invention, illustrated in a first or product retention position.
Figure 7B:
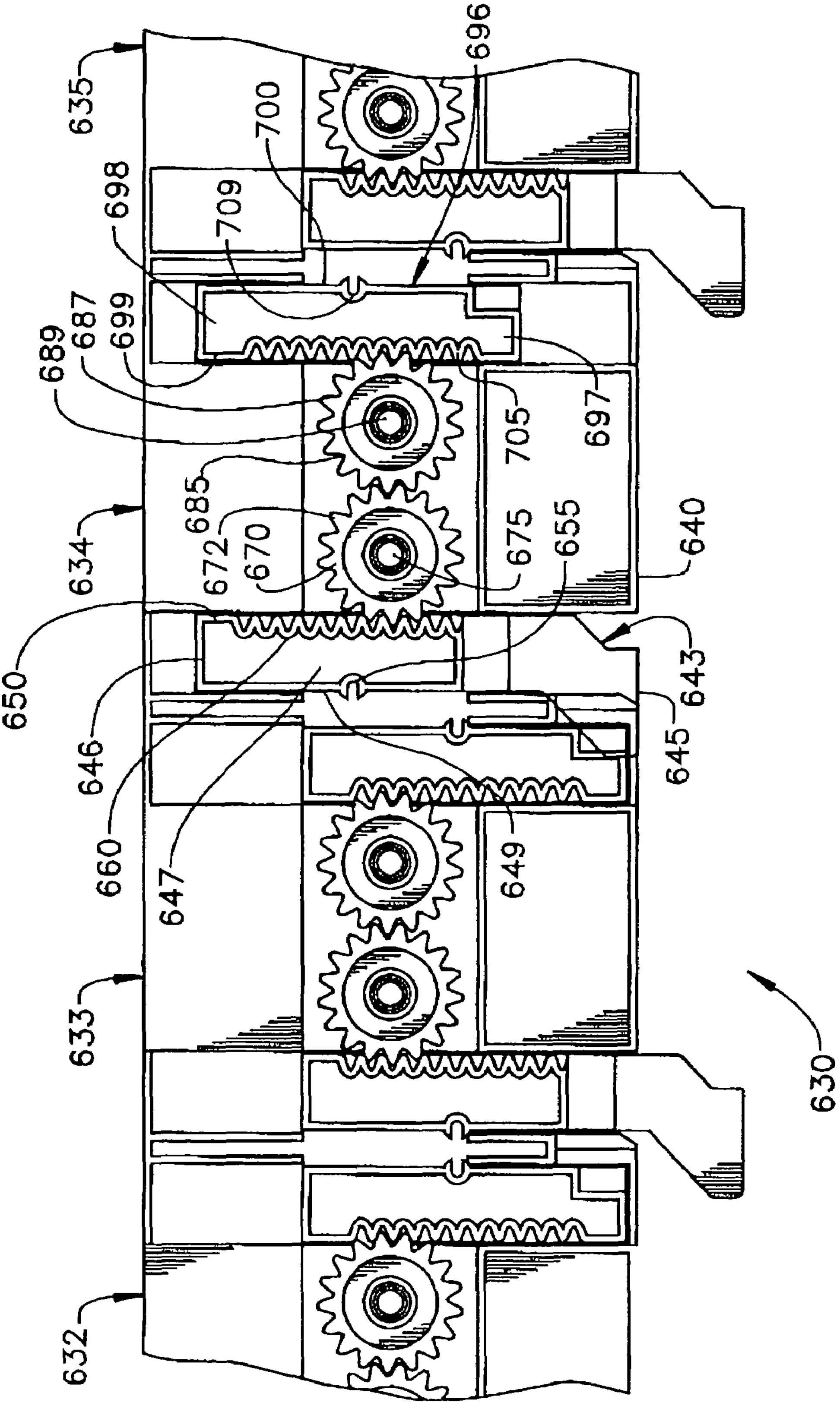
FIG. 7B is a plan view of the drive system of FIG. 7A with a portion thereof shown in a second or product dispensing position.
Figure 8:
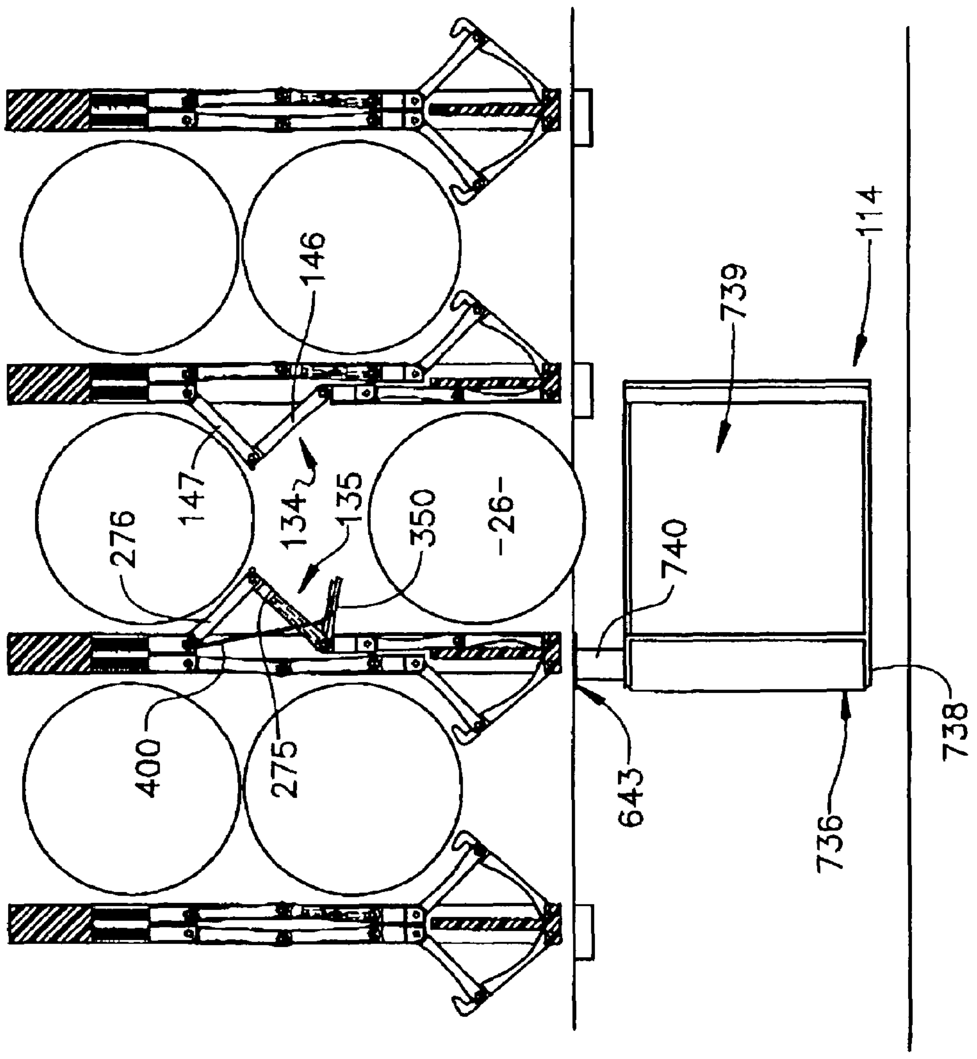
FIG. 8 is a top view of a product transport system triggering an activation member to release a selected product from a product queue in accordance with the invention.

Reference will now be made to FIGS. 7A, 7B and 8 in describing a preferred mechanism for activating release mechanisms 134 and 135 to discharge a selected product container 26 into product delivery cup 114. In accordance with the invention, a drive system 630 is mounted to an underside of each one of the plurality of product shelves 20-24. Drive system 630 includes a plurality of drive assemblies 632-635 that are operatively connected to respective dispensing units 33. However, as each drive assembly 632-635 is similar, a detailed description will be made with respect to drive assembly 634 with an understanding that the remaining drive assemblies 632, 633 and 635 are substantially, identically constructed.

Drive assembly 634 includes a main housing 640 that supports an activation member 643. Activation member 643 includes a first end 645 adapted to be engaged by structure carried by product delivery cup 114 to release the selected product, and extends to a second end 646 through an intermediate portion 647. At this point, it should be understood that activation member 643 extends substantially parallel to an underside (not separately labeled) of, for example, product support shelf 20. That is, given that each product delivery shelf 20-24 is preferably arranged at a downward angle causing product containers 26 to migrate to a forward position of each product queue, activation member 643 extends along a corresponding angle. In any case, activation member 643 includes first and second opposing side sections 649 and 650, with side section 649 being provided with a connector member 655 in the preferred form of a slot, and side section 650 including a plurality of geared teeth 660 which establishes a gear rack.

Activation member 643 is operatively connected to a first geared link or pinion 670 having a plurality of teeth 672 that are adapted to mesh with geared teeth 660 on activation member 643. First geared link 670 rotates about a pin member 675 that is supported in main housing 640. First geared link 670 is operatively connected to a second geared link or pinion 685. Second geared link 685 includes a plurality of teeth 687 that are adapted to mesh with teeth 672 on first geared link 670. Preferably, first and second geared links 670 and 685 are identical. However, it should be understood that, so long as a pitch diameter of teeth 672 and 687 are similar, there is no need for first and second geared links 670 and 685 to be identical. In any event, second geared link 685 rotates about a pin member 689 which is positioned adjacent to pin member 675 on main housing 640.

Second geared link 685 is operatively connected to a driven member 696 having a front end section 697, a rear end section 698 and opposing side sections 699 and 700. In a manner similar to that described above, first side section 699 includes a plurality of geared teeth 705 which mesh with teeth 687 on second gear link 685, while a connector member 709 is arranged on second side section 700. At this point, it should be noted that connector member 655 and connector member 709 are adapted to receive extending portions 234 and 340 of release mechanisms 134 and 135 respectively.

With the above-described construction, upon application of a force to front end 645, activation member 643 travels into main housing 640. As activation member 643 travels inward, geared teeth 660 engage with geared teeth 672, causing first geared link 670 to rotate clockwise. The clockwise rotation of first geared link 670 results in a counterclockwise rotation of second geared link 685, thereby shifting driven member 696 inward of main housing 640. That is, as second geared link

685 rotates, geared teeth 687 mesh with geared teeth 705, shifting drive member 696 in the same direction as activation member 643. Preferably, activation member 643 and driven member 696 shift inward in unison such that connector members 655 and 709 act upon extended portions 234 and 340, thereby simultaneously shifting first and second release mechanisms 134 and 135 between their product retention and product release positions.

In accordance with one preferred aspect of the invention, activation member 643 is operated by an activating mechanism 736 mounted in a housing portion 738 of product delivery cup 114 as shown in FIG. 8. In the embodiment shown, housing portion 738 is formed on a side of a product receiving portion 739 of product delivery cup 114. Upon selecting a particular product container 26, product delivery cup 114 is shifted to a position adjacent the particular product queue in which the selected product container resides. At this point, activating mechanism 736 extends a plunger 740 that engages with activation member 643 of drive assembly 634. As plunger 740 depresses activation member 643, release mechanisms 134 and 135 transition between product retention and product release positions in order to allow a selected product container 26 to be released into product delivery cup 114 for delivery to a consumer.

Figure 9:
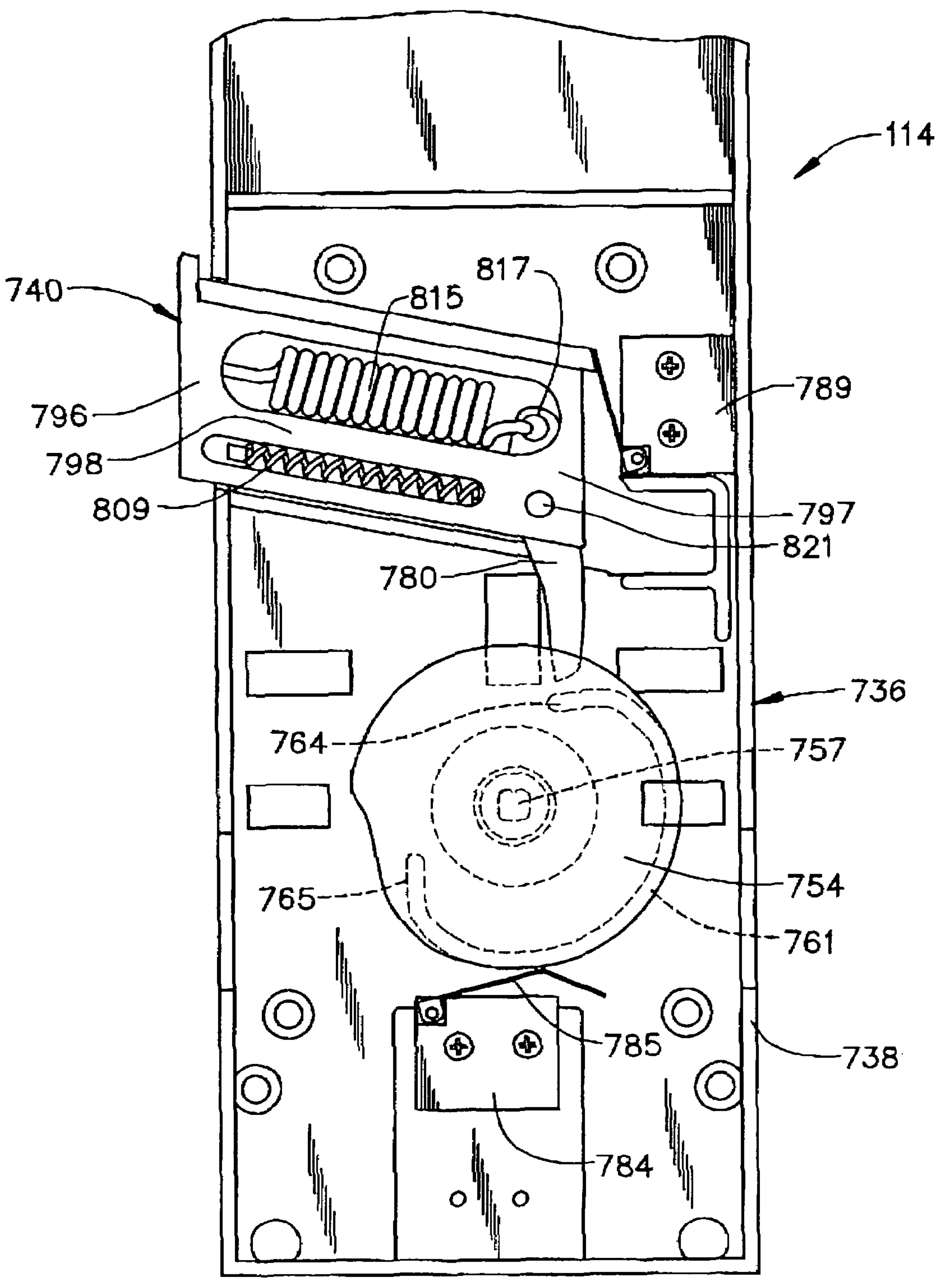
FIG. 9 is a side view of an activation mechanism incorporated in the product transport system of FIG. 8, with the activation mechanism in a first or retracted position.
Figure 10:
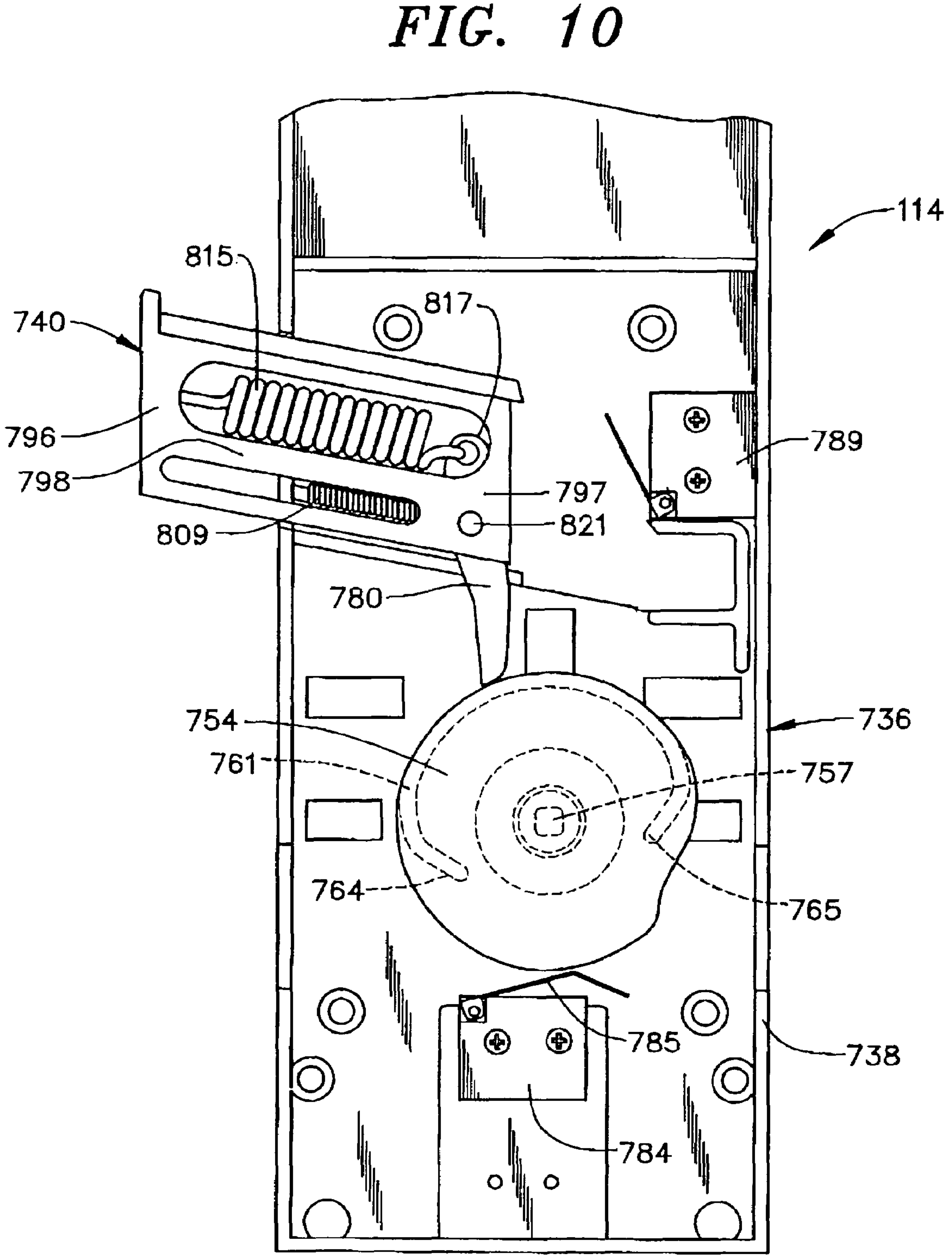
FIG. 10 is a side view of the product transport system of FIG. 9 illustrating the activation mechanism in a second or extended position.

At this point, reference will be made to FIGS. 9 and 10 in describing a preferred embodiment of activating mechanism 736. In the embodiment shown, housing portion 738 is formed in a side portion (not separately labeled) of product delivery cup 114. Activating mechanism 736 includes a motor (not shown) operatively connected to a cam member 754 through a drive shaft 757. Cam member 754 includes a lobe 761 having first and second end portions 764 and 765. Lobe 761 is adapted to engage a pusher member 780 that is operatively connected to plunger 740. As will be discussed more fully below, pusher member 780 is actually pivotally attached to plunger 740. In any event, lobe 761 is also adapted to engage a position-sensing microswitch 784 having an activation arm 785. Upon being shifted to a position adjacent a desired product queue, cam member 754 is rotated, moving lobe 761 into contact with pusher member 780 and causing plunger 740 to extend outward and engage activation member 643. At the same time, lobe 761 activates position-sensing microswitch 784 to indicate the beginning of a release cycle. Likewise, as plunger 740 extends outward, the position of a second position-sensing microswitch 789 is changed, indicating the beginning of a release cycle. Once cam member 754 has completed a full rotation, plunger 740 is returned into housing portion 738, with the positions of microswitches 784 and 789 again changing to indicate the completion of the release cycle. At this time, product delivery cup 114 is directed towards delivery chamber 65 of vending machine 2.

Figure 11:
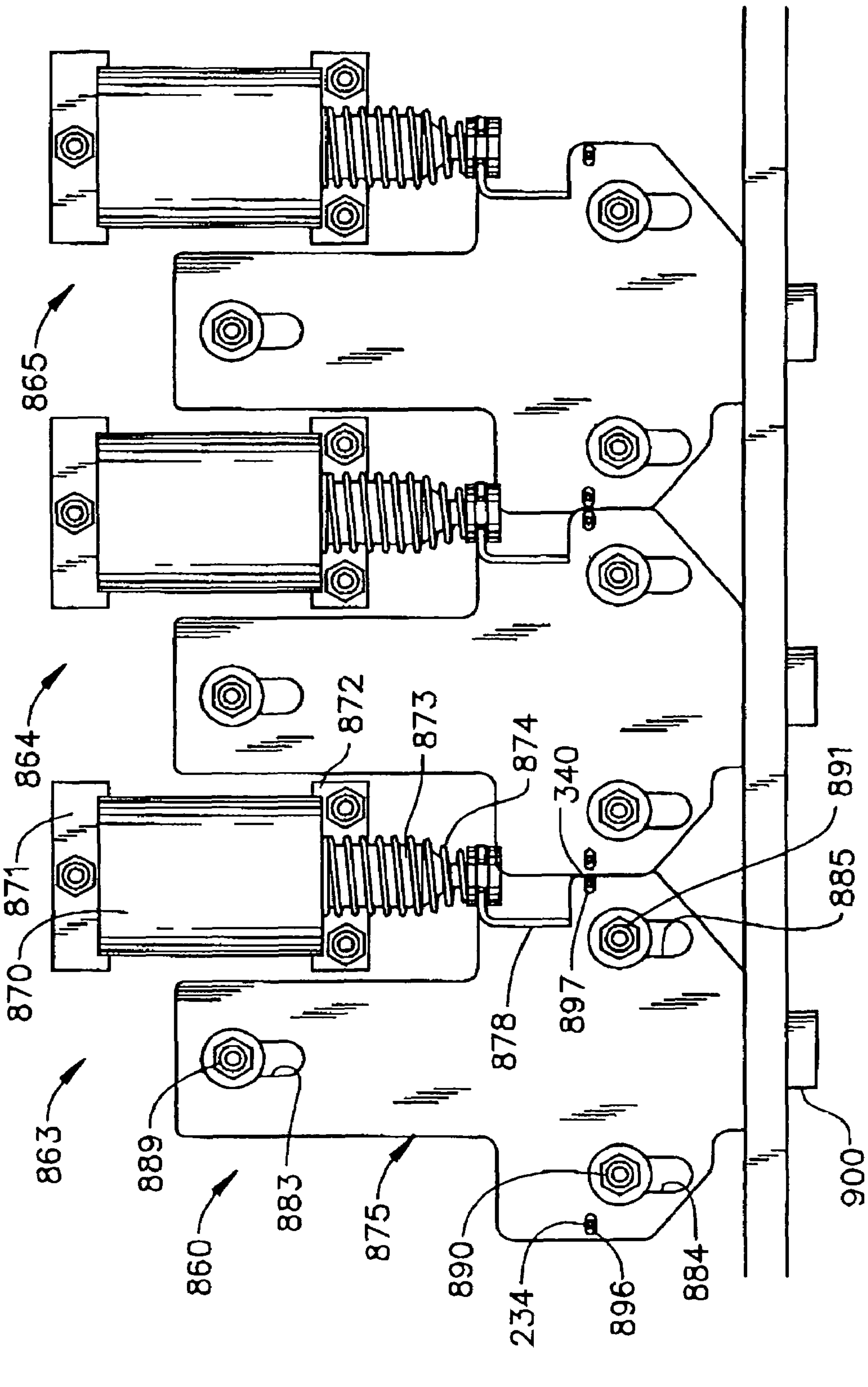
FIG. 11 is a plan view of a drive system constructed in accordance with another embodiment of the present invention.

In accordance with the most preferred form of the invention, plunger 740 includes a first end 796, a second end 797 and an intermediate portion 798. Arranged within intermediate portion 798 is a return spring 809 that biases plunger 740 to retract back into housing portion 738 of activating mechanism 736 at the completion of a release cycle. In addition to return spring 809, a safety spring 815 is mounted within intermediate portion 798. Safety spring 815 is operatively connected between first end 796 and a second end 817 of pusher member 780. Safety spring 815 allows pusher member 780 to collapse relative to lobe 761 if plunger 740 engages a non-movable obstruction during a product vend operation. For instance, in the event that plunger 740 inadvertently contacts one of the plurality of shelves 20-24, a force is absorbed by plunger 740 that overcomes a preset tension in safety spring 815 whereupon pusher member 780 pivots about a pin 821 allowing plunger 740 to retract back into housing portion 738 to prevent damage to activation mechanism 736 or shelves 20-24. In any case, it should be understood that the above-described activating mechanism is but one means to activate and release a selected product from one of the plurality of product shelves. That is, in addition to aligning a plunger with an activation arm, other systems, such as simply wiping across a mechanical or electrical activating member, could trigger a release of a product. For example, in accordance with an alternative embodiment of the present invention, mechanical drive system 630 is replaced by an electrical drive system such as indicated at 860 in FIG. 11. Drive system 860 includes a plurality of drive assemblies 863-865 that are mounted to an underside of one of the plurality of product shelves 20-24. However, as each drive assembly 863-865 is identical, a detailed description will be made with respect to drive assembly 863 with an understanding that the remaining drive assemblies 864 and 865 are substantially, identically constructed.

As shown, drive assembly 863 includes a solenoid 870 that is mounted to an underside of one of the plurality of product support shelves 20-24 through bracket elements 871 and 872. Solenoid 870 includes a plunger 873 having an associated spring 874 that is connected to a drive bracket 875 through a connecting member 878. Drive bracket 875 includes a plurality of slotted openings 883-885 through which pass an associated plurality of guide elements 889-891. Guide elements 889-891 are fixedly mounted relative to an underside of the one of the plurality of product support shelves 20-24 and terminate in mechanical fasteners (not separately labeled). In addition to slotted openings 883-885, drive bracket 875 includes a pair of pin receiving openings 896 and 897. Pin receiving opening 896 and 897 receive extended portions 234 and 340 of release mechanisms 134 and 135 respectively.

With this particular arrangement, activation of solenoid 870 causes plunger 873 to retract, shifting drive bracket 875 inward. As drive bracket 875 shifts inward, extended portions 234 and 340 shift in adjacent frames 162, causing release mechanisms 134 and 135 to transition between product retention and product release positions. At this point, it should be noted that solenoid 870 could be activated by depressing a switch, such as indicated at 900, mounted to a front side of one of the plurality of product shelves 20-24 adjacent each product queue 30. Alternatively, solenoid 870 may simply be interconnected to a control portion in vending machine 2 that activates solenoid 870 when product delivery cup 114 is in a product receiving position.

Although described with reference to preferred embodiments of the invention, it should be readily understood that various changes and/or modifications can be made to the invention without departing from the spirit thereof. For instance, the relative positions of the product storage zone, currency receiving zone and dispensing zone can be changed without departing from the spirit of the present invention. Also, the product transport system including a product delivery cup is but one possible mechanism for delivering a product to a consumer, other mechanisms such as conveyor belts can also be employed. In fact, at least when used in connection with vending products, such as snacks and non-carbonated beverages, which can be released from a product queue and allowed to simply fall into a dispensing chamber, no product transport system is required. In general, the invention is only intended to be limited by the scope of the following claims.

We claim:

1. A vending machine for storing articles to be selectively dispensed comprising:

a cabinet;

a product storage zone arranged within the cabinet;

at least one shelf positioned in the product storage zone for supporting articles prior to a vending operation;

a plurality of dividers extending along the at least one shelf and establishing a plurality of spaced product queues including first, second and third adjacent product queues;

a first integrated dispensing system mounted at a front end of one of the plurality of product queues, said first integrated dispensing system including a first release mechanism having a frame and a plurality of hinged plates supported by the frame for movement into and out of the first product queue, and a second release mechanism having a plurality of hinged plates supported by the frame for movement into and out of the second product queue, with a first hinged plate of said plurality of hinged plates of the second release mechanism including a queue spacing member, the queue spacing member extending a width of the first hinged plate beyond a hinge pin that links the first hinged plate to a second hinged plate of the plurality of hinged plates of the second release mechanism;

a second integrated dispensing system mounted at a front end of an adjacent one of the plurality of product queues, said second integrated dispensing system including a first release mechanism having a frame and a plurality of hinged plates supported by the frame for movement into and out of the second product queue, and a second release mechanism having a plurality of hinged plates supported by the frame for movement into and out the third product queue, one of said plurality of hinged plates of the second release mechanism including a queue spacing member projecting outward into the third product queue; and a drive mechanism operatively connected to the second release mechanism of the first integrated dispensing system and the first release mechanism of the second integrated dispensing system for selectively shifting the plurality of hinged plates of the first and second release mechanisms between article retention and article dispensing positions, wherein a first hinged plate of said plurality of hinged plates of the second release mechanism includes a queue spacing member, the queue spacing member extending a width of the first hinged plate beyond a hinge pin that links the first hinged plate to a second hinged plate of the plurality of hinged plates of the second release mechanism, wherein one of the plurality of hinged plates of one of the first and second release mechanisms includes a main plate member and a kicker, said kicker being shifted into the product queue when the first and second release mechanisms shift from a product retention position to a product dispensing position.

2. A vending machine for storing articles to be selectively dispensed comprising:

a cabinet;

a product storage zone arranged within the cabinet;

at least one shelf positioned in the product storage zone for supporting articles prior to a vending operation;

a plurality of dividers extending along the at least one shelf establishing a plurality of product queues; and an integrated dispensing system mounted at a front end of one of the plurality of product queues, said integrated dispensing system including a first release mechanism having a frame and a plurality of hinged plates supported by the frame for movement into and out of the first product queue, and a second release mechanism including a plurality of hinged plates supported by the frame for movement into and out of the second product queue, wherein a first hinged plate of said plurality of hinged plates of the second release mechanism includes a queue spacing member, the queue spacing member extending a width of the first hinged plate beyond a hinge pin that links the first hinged plate to a second hinged plate of the plurality of hinged plates of the second release mechanism, wherein one of the plurality of hinged plates of one of the first and second release mechanisms includes a main plate member and a kicker, said kicker being shifted into the product queue when the first and second release mechanisms shift from a product retention position to a product dispensing position.

3. The vending machine according to claim 2, wherein a first hinged plate of the plurality of hinged plates of the first release mechanism includes a queue spacing member, the queue spacing member extending a width of the first hinged plate beyond a hinge pin that links the first hinged plate to a second hinged plate of the plurality of hinged plates of the first release mechanism.

4. The vending machine according to claim 3, wherein the queue spacing member of the first hinged plate of each of the first and second release mechanisms projects outward into one of the plurality of product queues when the first and second release mechanisms are in a product retention position.

5. The vending machine according to claim 2, wherein the queue spacing member of the first hinged plate of each of the first and second release mechanisms lies flat against the frame of each of the first and second release mechanisms when the first and second release mechanisms are in a product dispensing position.

6. The vending machine according to claim 2, wherein at least one of the plurality of hinged plates of one of the first and second release mechanisms includes a queue spacing member projecting outwardly therefrom.

7. The vending machine according to claim 2, further comprising: a low torsion spring coupled to the kicker, said low torsion spring establishing a particular timing for deployment of the kicker.

8. A vending machine for storing articles to be selectively dispensed comprising:

a cabinet;

a product storage zone arranged within the cabinet;

at least one shelf positioned in the product storage zone for supporting articles prior to a vending operation;

a plurality of dividers extending along the at least one shelf and establishing a plurality of spaced product queues including first, second and third adjacent product queues;

a first release mechanism mounted at a front end of one of the plurality of dividers, said first release mechanism having a frame for supporting a plurality of hinged plates for movement into and out of the second product queue, wherein a first hinged plate of said plurality of hinged plates includes a queue spacing member, the queue spacing member extending a width of the first hinged plate beyond a hinge pin that links the first hinged plate to a second hinged plate of the plurality of hinged plates; and a second release mechanism mounted at a front end of an adjacent one of the plurality of dividers, said second release mechanism having a frame for supporting a plurality of hinged plates for movement into and out of the second product queue, wherein one of the plurality of hinged plates of one first release mechanism includes a main plate member and a kicker member, said kicker member being shifted into the product queue when the first release mechanism shifts from a product retention position to a product dispensing position.

9. The vending machine according to claim 8, wherein a first hinged plate of the plurality of hinged plates of the second release mechanism includes a queue spacing member, the queue spacing member extending a width of the first hinged plate beyond a hinge pin that links the first hinged plate to a second hinged plate of the plurality of hinged plates.

10. The vending machine according to claim 8, wherein each of the plurality of hinged plates of the first release mechanism include queue spacing members, one of the queue spacing members projecting into the second product queue when the first release mechanism is in a product retention position and another of the queue spacing members projecting into the second product queue when the first release mechanism is in a product dispensing position.

11. The vending machine according to claim 8, wherein at least one of the plurality of hinged plates of one first release mechanism includes a queue spacing member projecting outwardly therefrom.

12. The vending machine according to claim 8, further comprising: a low torsion spring coupled to the kicker plate, said low torsion spring establishing a particular timing for deployment of the kicker.

13. The vending machine according to claim 8, wherein each of the first and second release mechanisms includes a plurality of elongated hinge pins interconnecting respective ones of the plurality of hinged plates, one of said plurality of hinge pins including an extension that projects downward into the second product queue.

14. In a vending machine having a cabinet, a product storage zone arranged within the cabinet, at least one shelf positioned in the product storage zone for supporting a plurality of product containers prior to a vending operation and a plurality of dividers extending along the at least one shelf establishing a plurality of spaced product queues, a method of releasing a selected one of the plurality of product containers to a consumer comprising:

activating a drive mechanism coupled to both first and second release mechanisms mounted at front portions of adjacent ones of the plurality of product queues to shift a first plurality of hinged plates supported for pivotal movement to the first release mechanism between a product retention position and a product release position while simultaneously shifting a second plurality of hinged plates supported for pivotal movement to the second release mechanism between a product retention position and a product release position to dispense the selected one of the plurality of product containers; and establishing a desired spacing between the first and second release mechanisms by incorporating a queue spacing member into a first hinged plate of the first plurality of hinged plates, the queue spacing member extending a width of the first hinged plate beyond a hinge pin that links the first hinged plate to a second hinged plate of the first plurality of hinged plates, wherein one of the plurality of hinged plates of one of said first and second plurality of hinged plates includes a kicker member and wherein shifting the one of said first and second plurality of hinged plates comprises urging the selected product container forward in the product queue with the kicker member.

15. The method of claim 14, further comprising:

aligning a product transport system with one of the plurality of spaced product queues; and extending a plunger from the product transport system to activate the drive mechanism.

16. The method of claim 14, further comprising: establishing a desired spacing between the first and second release mechanisms by incorporating a queue spacing member into one of the second plurality of hinged plates.

17. The method of claim 16, wherein each of the queue spacing members comprises a tab portion forming essentially a right angle with the remaining portion of the queue spacing member.

18. The method of claim 16, wherein one of the queue spacing members projects into the product queue when the first and second release mechanisms are in the product retention position and another of the queue spacing members extends into the product queue when the first and second release mechanisms are in the product release position.

19. The method of claim 14, further comprising: guiding a selected product across an extension provided on one of a plurality of elongated hinge pins of the first plurality of hinged plates.

20. The method of claim 14, wherein at least one of the plurality of hinged plates of one of said first and second plurality of hinged plates includes a queue spacing member projecting outwardly therefrom.

* * * * *